US008616671B2

(12) United States Patent
Lawther et al.

(10) Patent No.: US 8,616,671 B2
(45) Date of Patent: Dec. 31, 2013

(54) PRINTING MULTI-CHANNEL IMAGE ON WEB RECEIVER

(75) Inventors: Joel Sherwood Lawther, Pittsford, NY (US); David James Cornell, Scottsville, NY (US)

(73) Assignee: Eastman Kodak Company, Rochester, NY (US)

( * ) Notice: Subject to any disclaimer, the term of this patent is extended or adjusted under 35 U.S.C. 154(b) by 315 days.

(21) Appl. No.: 13/094,865

(22) Filed: Apr. 27, 2011

(65) Prior Publication Data

US 2012/0274694 A1 Nov. 1, 2012

(51) Int. Cl.

| | |
|---|---|
| ***B41J 29/38*** | (2006.01) |
| ***B41J 2/01*** | (2006.01) |
| *B41J 2/175* | (2006.01) |
| *B41J 2/385* | (2006.01) |
| *B41J 2/325* | (2006.01) |
| *B41J 17/00* | (2006.01) |
| *B41J 2/315* | (2006.01) |
| *B41J 11/00* | (2006.01) |
| *B41J 2/435* | (2006.01) |
| *G01D 11/00* | (2006.01) |
| *G01D 15/24* | (2006.01) |
| *G01D 15/10* | (2006.01) |
| *G03G 9/08* | (2006.01) |
| *B41M 5/00* | (2006.01) |

(52) U.S. Cl.
USPC ................. 347/16; 347/88; 347/99; 347/101; 347/102; 347/103; 347/104; 347/105; 347/153; 347/215; 347/218; 347/219; 347/220; 347/221; 347/262; 347/264; 270/1.01; 270/5.02; 270/12; 270/15; 270/17; 400/40; 400/499; 400/511

(58) Field of Classification Search
USPC ............... 347/16, 88, 99, 101–105, 153, 215, 347/218–221, 262, 264; 270/1.01, 5.02, 12, 270/15, 17; 400/40, 499, 511
See application file for complete search history.

(56) References Cited

U.S. PATENT DOCUMENTS

| | | | |
|---|---|---|---|
| 5,021,804 A | 6/1991 | Nozawa et al. | |
| 5,441,353 A | 8/1995 | Kim | |
| 6,109,745 A * | 8/2000 | Wen | 347/101 |
| 7,250,959 B2 | 7/2007 | Cloutier et al. | |
| 7,350,902 B2 | 4/2008 | Dietl et al. | |
| 7,507,046 B2 | 3/2009 | Ehmann | |
| 2002/0130909 A1 | 9/2002 | Wojcik | |
| 2005/0093959 A1 | 5/2005 | Kitamura | |

FOREIGN PATENT DOCUMENTS

| | | |
|---|---|---|
| JP | H05-147284 | 6/1993 |
| JP | 2004-217342 | 8/2004 |

* cited by examiner

*Primary Examiner* — Laura Martin
*Assistant Examiner* — Jeremy Bishop
(74) *Attorney, Agent, or Firm* — Christopher J. White

(57) ABSTRACT

A multi-channel image is printed on a web receiver by a plurality of printing modules. The receiver is entrained around a take-up roll on a movable transport. During printing, the transport moves past the printing modules while the take-up roll holds the receiver in position with respect to the transport, and then the transport comes to a stop and the take-up roll draws the receiver across the transport. A cutter downstream of the take-up roll cuts off the printed portion of the web receiver to provide a printed sheet.

10 Claims, 7 Drawing Sheets

PRINTING MULTI-CHANNEL IMAGE ON WEB RECEIVER

FIELD OF THE INVENTION

This invention relates to printing images on continuous-web receivers.

BACKGROUND OF THE INVENTION

Color and other multi-channel images can be printed using ink jet printers, multicolor transferable toner printers, heat sensitive coated paper printers, thermal dye transfer printers, and other types of printers. Many mass-market retail establishments have user-friendly kiosks at which shoppers make color prints. Because the kiosks use large amounts of paper, the images can be printed on a continuous web of paper, often supplied in roll form and fed from a feed roll to the printhead that applies the image to the receiver. The images are later separated from each other and from the web by a suitable cutter or knife.

It is desirable when roll-feeding to pull the web past the printhead. This provides positive control of the web as it passes the printhead. In various schemes, the printhead forms part of the pulling apparatus, as in U.S. Pat. No. 5,441,353 to Kim. In other schemes, a separate pulling mechanism beyond the printhead is used, as in U.S. Pat. No. 5,021,804 to Nozawa et al. However, printing technologies such as inkjet printing use non-contact printheads, so the printhead cannot form part of the pulling apparatus. Moreover, using a pulling mechanism downstream of the printhead results in the receiver between the printhead and the pulling mechanism being unprinted and discarded, increasing waste and print cost.

Other schemes push the web past the printhead. Examples of such schemes are JP Publication No. H05-147284 (1993) by Kikumura et al. and JP Publication No. 2004-217342 by Iemura et al. However, these schemes do not provide positive control of the receiver until it engages a pulling member sometime after printing begins. This can result in variations in the spacing between the receiver and a non-contact printhead in the leading portion of the image, changing image attributes. These changes can produce a visibly-objectionable difference between the portion of the image pushed past the printhead and the portion pulled past. Pushing the web past the printhead over its entire length exacerbates these problems and can lead to receiver buckle, possibly contacting a non-contact printhead and damaging it (a “head strike”).

There is a continuing need, therefore, for a way of printing images on a continuous web with reduced waste of paper while maintaining consistent image quality.

SUMMARY OF THE INVENTION

According to an aspect of the present invention, there is provided apparatus for printing a multi-channel image on a web receiver, comprising:

a) a plurality of printing modules arranged in sequence along a feed path of the receiver and spaced apart from the feed path, each adapted to produce on the receiver a separation image corresponding to one channel of the multi-channel image;

b) a movable transport for the web receiver, the transport including a take-up roll around which the receiver is entrained and a cutter arranged downstream of the take-up roll for selectively cutting the web receiver, wherein:

the transport is operative in a first state to traverse from the leading printing module to the trailing printing module;

the take-up roll is operative in the first state to retain the receiver in position with respect to the transport; and the take-up roll is operative in a second state to draw the receiver across the transport; and c) a controller adapted to perform the following steps in order:

operate the transport and take-up roll in the first state and activate one or more of the printing modules in sequence to print a first portion of the image;

once the transport traverses to bring the web receiver into operative arrangement with the plurality of printing modules, operate the take-up roll in the second state and activate one or more of the printing modules to print a second portion of the image; and cause the cutter to cut the web receiver to provide a cut sheet bearing the printed image.

According to another aspect of the present invention, there is provided a method of producing a print of a multi-channel image on a web receiver, comprising:

entraining the web receiver around a take-up roll on a transport;

traversing the transport past a plurality of non-contact printing modules and depositing respective separation images on the receiver by activating the printing modules as they are brought into operative association with the receiver on the transport, so that a first portion of the image is printed; and drawing the receiver past the printing modules using the take-up roll and activating the printing modules to deposit respective separation images on the receiver, so that a second portion of the image is printed.

According to another aspect of the present invention, there is provided a method of producing a print of a multi-channel image on a web receiver, comprising:

entraining the web receiver around a take-up roll on a transport;

traversing the transport past a plurality of non-contact printing modules and depositing respective separation images on the receiver by activating the printing modules as they are brought into operative association with the receiver on the transport, so that a first portion of the image is printed;

drawing the receiver past the printing modules using the take-up roll and activating the printing modules to deposit respective separation images on the receiver, so that a second portion of the image is printed, wherein a selected one of the printing modules deposits a first-layer separation image on a selected area of the receiver in the first or second portion;

repositioning the receiver by returning the transport or rewinding the receiver, or both, so that the selected area of the receiver is brought into operative association with the selected printing module; and moving the receiver by traversing the transport or drawing the receiver, or both, while activating the selected printing module to deposit a second-layer separation image on the selected area of the receiver.

An advantage of this invention is that it provides reduced waste of receiver material in a non-contact, continuous-web printer. It maintains positive tension on the paper during printing, improving image quality. It is not limited in the total length of sheet that can be printed, and it is not limited to certain predetermined sizes of cut sheet. The receiver only moves in a single direction during printing, which can improve throughput. The movable transport can overcome the inertia of the supply of web receiver, permitting the take-up roll to be driven by a smaller, more responsive motor, and permitting the take-up roll to have a lower diameter than would be required if the take-up roll had to overcome the web inertia. Using a smaller-diameter take-up roll reduces the amount of receiver wasted as a leader before the image. In embodiments using arcuate transports with concentric supply rolls, the device is more compact than prior-art systems with supply rolls arranged ahead of the printing modules. Unlike prior schemes, the amount of leader in the present invention is independent of the number of stations. This is particularly useful for additive-fabrication schemes, which can have tens of stations for jetting different components.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

The attached drawings are for purposes of illustration and are not necessarily to scale.

DETAILED DESCRIPTION OF THE INVENTION

In the following description, some embodiments will be described in terms that would ordinarily be implemented as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, systems and methods described herein. Other aspects of such algorithms and systems, and hardware or software for producing and otherwise processing the image signals involved therewith, not specifically shown or described herein, are selected from such systems, algorithms, components, and elements known in the art. Given the systems and methods as described herein, software not specifically shown, suggested, or described herein that is useful for implementation of any embodiment is conventional and within the ordinary skill in such arts.

A computer program product can include one or more storage media, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method(s) according various embodiment(s).

Figure 1:
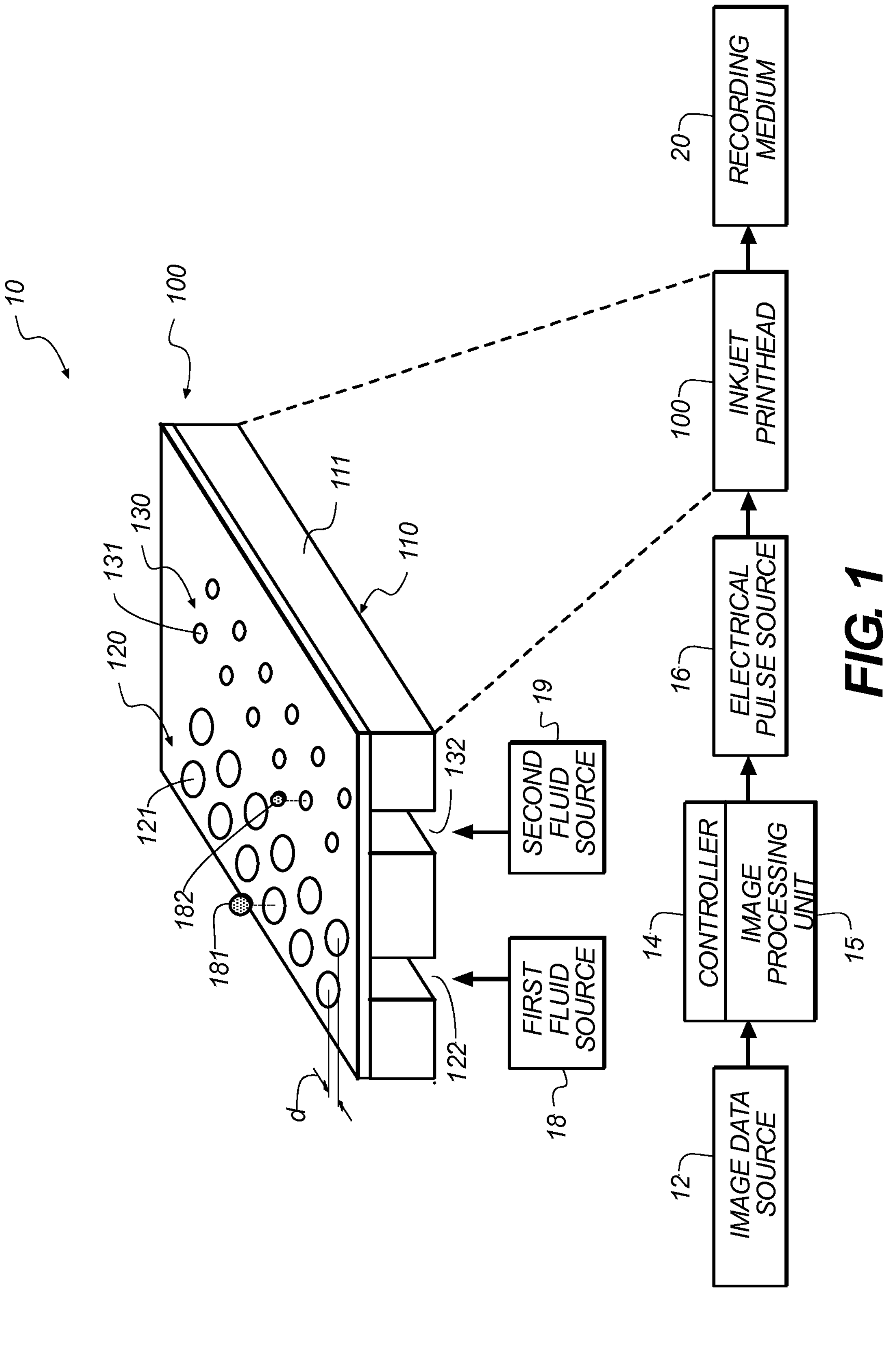
FIG. 1 is a schematic representation of an inkjet printer system useful with various embodiments.

FIG. 1 is a schematic representation of an inkjet printer system 10 useful with various embodiments. Additional details are set forth in U.S. Pat. No. 7,350,902, the disclosure of which is incorporated by reference herein. Inkjet printer system 10 includes an image data source 12, which provides data signals that are interpreted by a controller 14 as being commands to eject drops. Controller 14 includes an image processing unit 15 for rendering images for printing, and outputs signals to an electrical pulse source 16 of electrical energy pulses that are inputted to an inkjet printhead 100, which includes at least one inkjet printhead die 110.

In the example shown in FIG. 1, there are two nozzle arrays. Nozzles 121 in the first nozzle array 120 have a larger opening area than nozzles 131 in the second nozzle array 130. In this example, each of the two nozzle arrays 120, 130 has two staggered rows of nozzles 121, 131, each row having a nozzle density of 600 per inch. The effective nozzle density d in each array is thus 1200 per inch (i.e., d=1/1200 inch in FIG. 1). If pixels on the recording medium 20 were sequentially numbered along the paper advance direction, the nozzles 121, 131 from one row of an array 120, 130 would print the odd numbered pixels, while the nozzles 121, 131 from the other row of the array 120, 130 would print the even numbered pixels. Printheads can include any number of nozzle arrays. In various embodiments, a printer includes one nozzle array.

In fluid communication with each nozzle array 120, 130 is a corresponding ink delivery pathway 122, 132. Ink delivery pathway 122 is in fluid communication with the first nozzle array 120, and ink delivery pathway 132 is in fluid communication with the second nozzle array 130. Portions of ink delivery pathways 122 and 132 are shown in FIG. 1 as openings through printhead die substrate 111. One or more inkjet printhead dice 110 will be included in inkjet printhead 100, but for greater clarity only one inkjet printhead die 110 is shown in FIG. 1. The inkjet printhead dice 110 are arranged on a support member as discussed below relative to FIGS. 2A-2B. In FIG. 1, first fluid source 18 supplies ink to first nozzle array 120 via ink delivery pathway 122, and second fluid source 19 supplies ink to second nozzle array 130 via ink delivery pathway 132. Although distinct fluid sources 18 and 19 are shown, in some applications it may be beneficial to have a single fluid source supplying ink to both the first nozzle array 120 and the second nozzle array 130 via ink delivery pathways 122 and 132 respectively. Also, in some embodiments, fewer than two or more than two nozzle arrays can be included on printhead die 110. In some embodiments, all nozzles on inkjet printhead die 110 are the same size (within manufacturing tolerances), rather than having multiple sizes of nozzles on inkjet printhead die 110.

Not shown in FIG. 1, are the drop forming mechanisms associated with the nozzles. Drop forming mechanisms can be of a variety of types, some of which include a heating element to vaporize a portion of ink and thereby cause ejection of a droplet, or a piezoelectric transducer to constrict the volume of a fluid chamber and thereby cause ejection, or an actuator which is made to move (for example, by heating a bi-layer element) and thereby cause ejection. In any case, electrical pulses from electrical pulse source 16 are sent to the various drop ejectors according to the desired deposition pattern. In the example of FIG. 1, droplets 181 ejected from the first nozzle array 120 are larger than droplets 182 ejected from the second nozzle array 130, due to the larger nozzle opening area. Typically other aspects of the drop forming mechanisms (not shown) associated respectively with nozzle arrays 120 and 130 are also sized differently in order to provide desired drop characteristics for the different sized drops. During operation, droplets of ink are deposited on a recording medium 20. To print a multi-channel image, e.g., an image containing yellow (Y), magenta (M), cyan (C), and black (K) image data, each image channel is printed separately using a respective nozzle array. Other colors, such as orange (Or), green (G), and transparent protectant (P) can be used in producing prints. As used herein, a "multi-channel image" is data defining respective patterns of a plurality of respective inks to be deposited on a receiver. This can be a conventional multi-color photograph or line-art image, or a mask set for a device to be fabricated by printing with additive-fabrication materials or etchants.

Figure 2A:
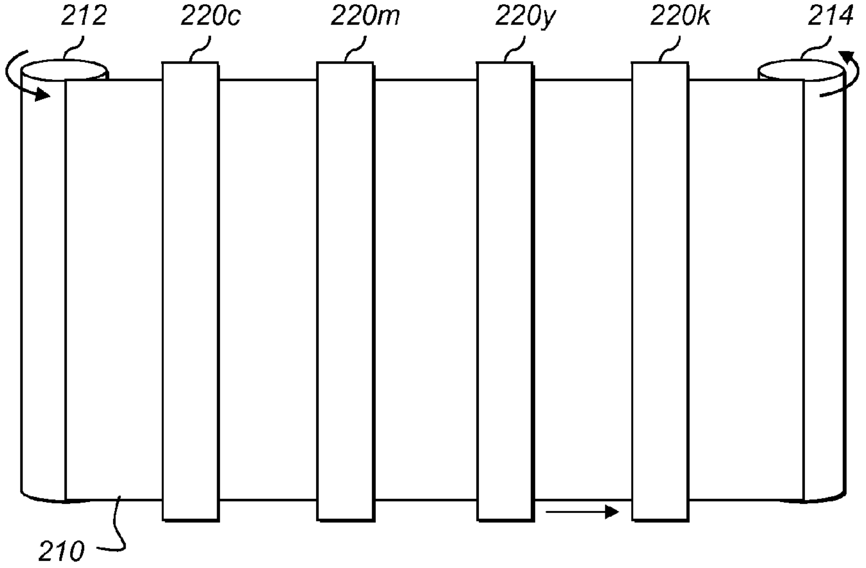
FIGS. 2A and 2B are a plan and an elevation, respectively, of a multi-component inkjet printer.
Figure 2B:
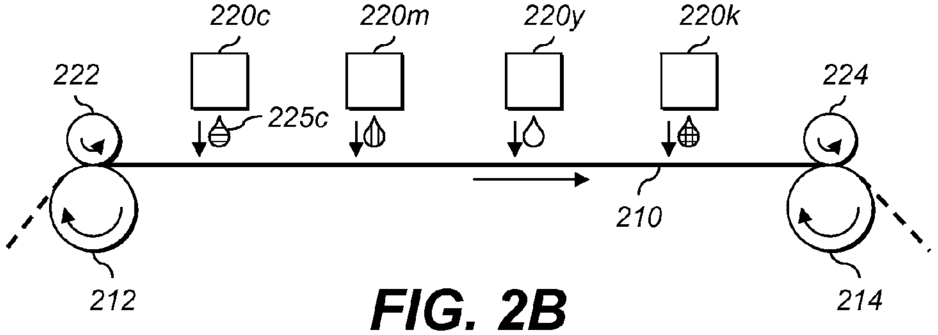

FIG. 2A shows a plan, and FIG. 2B an elevation, of a multi-component inkjet printer. Web receiver 210 is pulled from supply roll 212, travels from left to right, and is wound onto take-up roll 214. Printing modules 220*c*, 220*m*, 220*y*, and 220*k* extend across the full width of receiver 210 and deposit, respectively, cyan, magenta, yellow, and black ink. For example, cyan printing module 220*c* deposits cyan ink droplets 225*c*. Any number, width, and color order of printing modules can be used. In embodiments using continuous or drop-on-demand inkjet printing, each printing module 220*c*, 220*m*, 220*y*, 220*k* includes a respective printhead (not shown). Supply roll 212 and take-up roll 214 can be rolls of receiver material. They can also be drums or bars around which receiver 210 is entrained, and the initial supply and final take-up of receiver material can be performed by other components. This is represented graphically by the dashed extensions of receiver 210. In various embodiments, supply tensioner 222 and take-up tensioner 224 are driven by motors (not shown). Supply tensioner 222 and take-up tensioner 224 maintain a selected tension on receiver 210 while it is being printed. Tension can also be maintained by underdriving supply roll 212 or overdriving take-up roll 214. In various embodiments, tension is selected to maintain the surface of the receiver substantially normal to the ink or other colorant from each printing module 220*c*, 220*m*, 220*y*, 220*k*, without tearing the receiver 210.

In embodiments, including those using printing technologies other than inkjet, each printing module 220*c*, 220*m*, 220*y*, 220*k* produces on the receiver 210, or causes to be produced on the receiver 210, a separation image corresponding to one channel (e.g., C, M, Y, or K) of the multi-channel image to be printed. The printing modules 220*c*, 220*m*, 220*y*, 220*k* produce the images without coming into mechanical contact with the receiver. That is, the receiver 210 and the printing modules 220*c*, 220*m*, 220*y*, 220*k* are spaced apart during normal operation, although they can come into contact if the receiver 210 buckles or cockles severely. Not all printing modules are necessarily used for each image.

Figure 3:
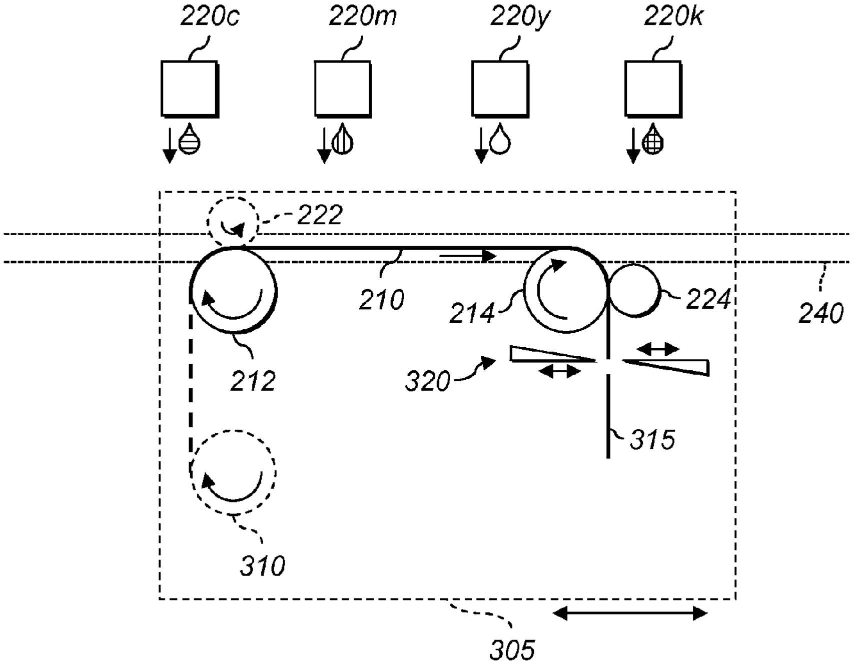
FIG. 3 shows an elevational cross-section of printing apparatus for printing a multi-channel image on a web receiver according to various embodiments.

FIG. 3 shows an elevational cross-section of printing apparatus for printing a multi-channel image on a web receiver according to various embodiments. Printing modules 220*c*, 220*m*, 220*y*, 220*k*, receiver 210, supply roll 212, optional supply tensioner 222, take-up roll 214, and take-up tensioner 224 are as shown in FIG. 2. In some embodiments, feed roll 310 holds the receiver material; the web is entrained around supply roll 212. Tension can be maintained by underdriving feed roll 310. In other embodiments, a platen is placed under receiver 210 opposite one or more printhead(s) 220*c*, 220*m*, 220*y*, 220*k*, as discussed below with respect to FIG. 4.

Cutter 320 selectively cuts web receiver 210 to form printed sheets 315. Cutter 320 can include one or more knives, rotary cutting blades, or automatic scissors or shears. Cutter 320 is arranged downstream of take-up roll 214 in the direction of travel of receiver 210.

Transport 305 is a movable transport for web receiver 210. Transport 305 includes optional feed roll 310, supply roll 212, optional supply tensioner 222, receiver 210, take-up roll 214, take-up tensioner 224, and cutter 320. Transport 305 also includes mounting hardware (not shown) to hold these components in position with respect to each other so that all components of transport 305 can move past printheads 220*c*, 220*m*, 220*y*, 220*k* together. Transport 305 can be moved by a linear slide or driven belt. The movement of transport 305, and the movement of receiver 210 past supply roll 212 and take-up roll 214, causes receiver 210 to move in feed path 240. Printing modules 220*c*, 220*m*, 220*y*, and 220*k* are arranged in sequence along feed path 240, and are spaced apart from feed path 240. In various embodiments, transport 305 is curved, or rotates (e.g., using a servo) rather than, or in addition to, translating.

In alternative embodiments, a collection roll (not shown) is used instead of cutter 320. This permits roll-to-roll printing with reduced leader waste. In various embodiments, the collection roll is unwound into a second printing unit having a plurality of print modules to print images on the back side of receiver 210. Alternatively, the collection roll can be removed from the printer and installed as feed roll 310 in the same printer or a different printer to produce backside prints. In these embodiments, the roll unwinds counterclockwise after installation as feed roll 310, since it is wound onto the collection roll clockwise (or, in general, unwinds in the opposite direction of winding).

In still other embodiments, cutter 320 is a perforator, e.g., a full-width die punch or a wheel cutter with spikes that traverses the width of receiver 210. In these embodiments, image content can be printed on receiver 210 up to the perforation on both sides. This reduces the length of the leader to the width of the perforation line, generally <0.5 mm. This provides printing with reduced leader, with reduced probability of bursting the perforations as can happen in a roll-to-roll process. Moreover, these embodiments provide prints one at a time, which is particularly useful in a kiosk. Mounting the perforator on transport 305 permits custom- or variable-length prints, as opposed to the fixed-length prints of pre-perforated receiver stock.

Figure 4:
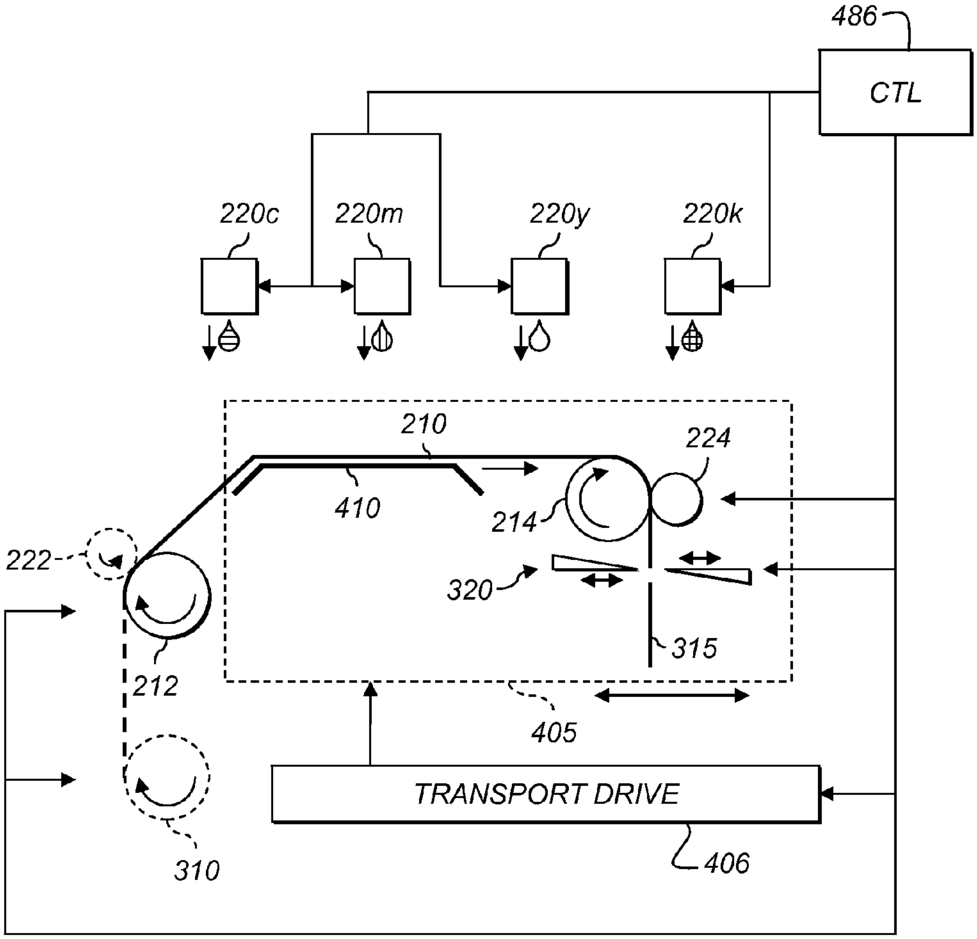
FIG. 4 shows an elevational cross-section of printing apparatus according to various embodiments.

FIG. 4 shows an elevational cross-section of printing apparatus according to various embodiments. Printheads 220*c*, 220*m*, 220*y*, 220*k*, receiver 210, supply roll 212, optional supply tensioner 222, take-up roll 214, take-up tensioner 224, optional feed roll 310, cutter 320, and printed sheet 315 are as shown in FIGS. 2 and 3.

Transport 405 includes platen 410, but does not include supply roll 212, optional supply tensioner 214, or optional feed roll 310. Receiver 210 can bend as it reaches platen 410 (as shown), optionally over a roller or ski, or not. In various embodiments, platen 410 is curved to cause receiver 210 to follow a curved path, as will be discussed further below.

Transport drive 406 is represented graphically here for clarity; similar drives are present in other embodiments described herein. Transport drive 406 can include a ball screw, linear slide, piezoelectric actuator, servomotor, or other component providing linear or rotational motion. Controller 486 is also shown here; similar controllers are present in other embodiments described herein. Controller 486 is a CPU, PLD, PAL, PLA, microcontroller, FPGA, or other firmware or software device adapted to control the components of the printer.

Controller 486 is adapted to cause transport 405 to move past printing modules 220*c*, 220*m*, 220*y*, 220*k* to print a portion of the image, and to cause take-up roll 214 to draw receiver 210 across transport 405 (here, platen 410 specifically) to print the remainder of the image. This will be shown with reference to FIGS. 5-7, which show examples of the operation of a printer as in FIG. 3.

Figure 5:
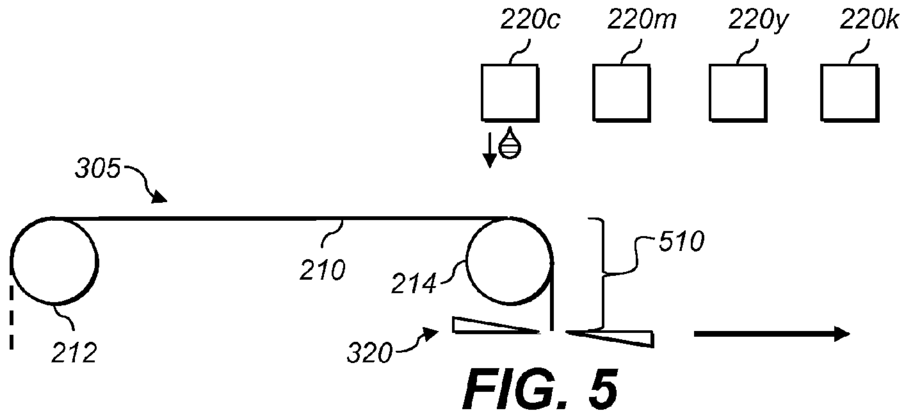
FIGS. 5-7 show examples of the operation of a printer as in FIG. 3.

FIG. 5 shows a printer as in FIG. 3 with transport 305 in a first position. Printing modules 220*c*, 220*m*, 220*y*, and 220*k*, supply roll 212, take-up roll 214, receiver 210, and cutter 320 are as shown in FIG. 3. In the first position, leading printing module 220*c* (i.e., the first printing module a point on the receiver 210 encounters as it moves) is the first printing module over transport 305. In embodiments using platen 410 (FIG. 4), leading printing module 220*c* is the first printing module over platen 410 (FIG. 4). Transport 305 is operative in a first state to traverse from the leading printing module (here, printing module 220*c*) to the trailing printing module (here, printing module 220*k*). In the first state, take-up roll 214 is operative to retain receiver 210 in position with respect to transport 305. In an embodiment, take-up roll 214 is braked in the first state (i.e., subjected to braking action, e.g., of a motor).

By "traverse from the leading printing module to the trailing printing module," it is meant that transport 305 moves so that receiver 210 is successively brought into operative arrangement with each printing module 220*c*, 220*m*, 220*y*, 220*k*. In FIG. 5, transport 305 is positioned so that receiver 210 is in operative arrangement with, i.e., can receive a separation image from, only printing module 220*c*. Receiver 210 will move with transport 305 to be in operative arrangement with more printing modules, and can be in operative arrangement with any number of printing modules simultaneously.

Controller 486 (FIG. 4) operates transport 305 and take-up roll 214 in the first state. Transport 305 begins moving to the right. Controller 486 (FIG. 4) then activates one or more of the printing modules 220*c*, 220*m*, 220*y*, 220*k* in sequence along feed path 240 (FIG. 3) to print a first portion of the image. Controller 486 (FIG. 4) determines which printing modules to activate using the image data.

Leader 510 is a portion of receiver 210 that is not printed since it is engaged with take-up roll 214. Leader 510 cannot be brought into operative arrangement with any printing module (e.g., 220*c*). Leader 510 will be discussed further below. Various embodiments advantageously provide smaller leaders than prior schemes, reducing waste.

Figure 6:
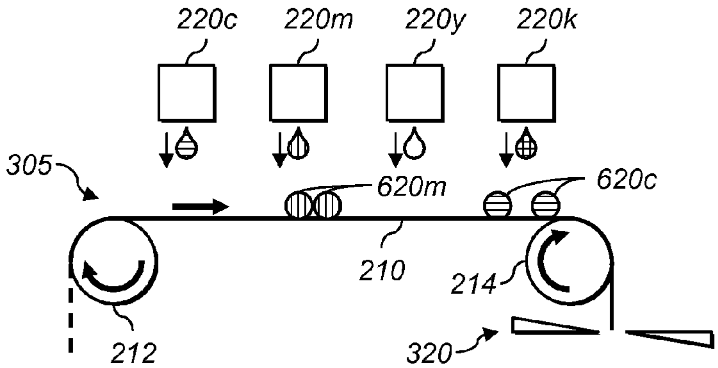

FIG. 6 shows the printer of FIG. 5 with transport 305 having traversed to a second position so that receiver 210 is in operative arrangement with all four printing modules 220*c*, 220*m*, 220*y*, and 220*k*. Supply roll 212, take-up roll 214, receiver 210, and cutter 320 are as shown in FIG. 3. In the second position, some of transport 305 can protrude beyond the printing modules (here, before printing module 220*c* or after printing module 220*k*). Cyan separation image 620*c* (not shown to scale) was previously formed on receiver 210 and has been moved out from under printing module 220*c* by the motion of transport 305. Magenta separation image 620*m* has just been formed by printing module 220*m*. Since the web receiver is in operative arrangement with the plurality of printing modules, controller 486 (FIG. 4) causes transport 305 to remain stationary. Controller 486 (FIG. 4) operates take-up roll 214 in a second state, in which take-up roll 214 draws receiver 210 across transport 305 (e.g., across platen 410, FIG. 4). While take-up roll 214 is drawing receiver 210 across transport 305, controller 486 (FIG. 4) activates one or more of the printing modules 220*c*, 220*y*, 220*m*, 220*k* to print a second portion of the image. In various embodiments, the first and second portions of the image together compose the whole image to be printed.

In various embodiments, controller 486 (FIG. 4) operates transport 305 and take-up roll 214 to provide a smooth transition between the first state and the second state. In an example, the speed of a point on receiver 210 with respect to one or more of the printing modules 220*c*, 220*m*, 220*y*, 220*k* is constant (within a selected tolerance) during a transition between the first state and the second state. Controller 486 slows transport 305 while speeding up take-up roll 214 so that receiver 210 continues moving relative to printing modules 220*c*, 220*m*, 220*y*, 220*k* through the transition and into the second state at the same speed it had in the first state. In various embodiments, transport 305 continues traversing until receiver 210 has reached a selected speed with respect to transport 305.

In various embodiments, controller 486 (FIG. 4) includes a closed-loop feedback system to provide a smooth transition so that objectionable image artifacts are not created as transport 305 slows down. The control loop can also adjust the timing of printing of each line, or the amount of ink deposited, to hide artifacts resulting from velocity variations throughout the transition, e.g., due to the weight of the supply roll or friction in the system. For example, dynamic friction with transport 305 can slow down receiver 210 compared to its speed when take-up roll 214 is running. The feedback system can also monitor the speed of receiver 210 using a laser Doppler system or camera (similar to an optical mouse sensor) monitoring the surface texture of receiver 210.

In one example, an inkjet press operating at a nominal web velocity of 200 m/min=131"/s and 300 dpi, each pixel passes a fixed point in 25.4 μs. Therefore, printing modules 220*c*, 220*m*, 220*y*, 220*k* each jet one line every 25.4 μs. It is desirable to move each dot no more than half a pixel from its intended position, so the pixel time is constant ±12.7 μs. Therefore, the speed of a given point on receiver 210 should be maintained between 133 m/min (25.4+12.7 μs) and 300 m/min (25.4-12.7 μs). This is "constant" as used above. In other embodiments, each dot moves no more than one-quarter of a pixel, here, ±6.35 μs.

Referring back to FIG. 5, in various embodiments, transport 305 moves with half of a desired web speed with respect to the printing modules 220*c*, 220*m*, 220*y*, 220*k*. Printing begins when take-up roll 214 reaches the midpoint of the group of printing modules, here between printing module 220*m* and printing module 220*y*. At that point, take-up roll 214 accelerates from stationary to an angular velocity appropriate to move receiver 210 with half the desired web speed in the same direction as transport 305 is moving. As a result, receiver 210 moves with the desired web speed. Referring to FIG. 6, as transport 305 completes its traverse and decelerates, take-up roll 214 accelerates to maintain receiver 210 at the desired web speed.

Figure 7:
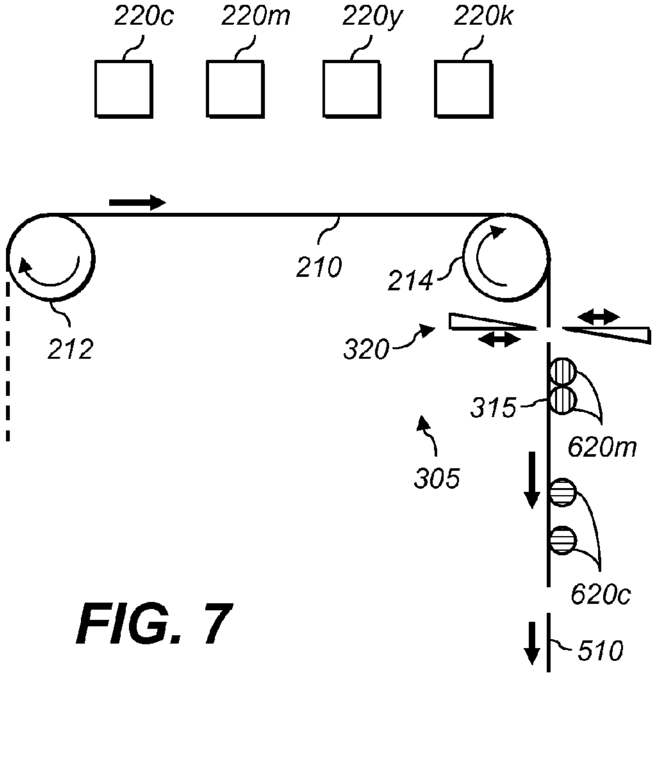

FIG. 7 shows the printer of FIG. 6 after the image has been printed. Printing modules 220*c*, 220*m*, 220*y*, and 220*k*, supply roll 212, take-up roll 214, receiver 210, and cutter 320 are as shown in FIG. 3. Separation images 620*c*, 620*m* have been drawn across transport 305 past cutter 320. Once separation images 620*c*, 620*m* pass cutter 320, controller 486 (FIG. 4) causes cutter 320 to cut web receiver 210 to provide printed sheet 315 bearing the printed image (here, separation images 620*c*, 620*m*). Controller 486 (FIG. 4) can cause cutter 320 to cut web receiver 210 to provide printed sheet 315 having a selected length, e.g., 11" (for US Letter paper) or 297 mm (A4 paper). Cutter 320 can also separate leader 510 from printed sheet 315.

Figure 8A:
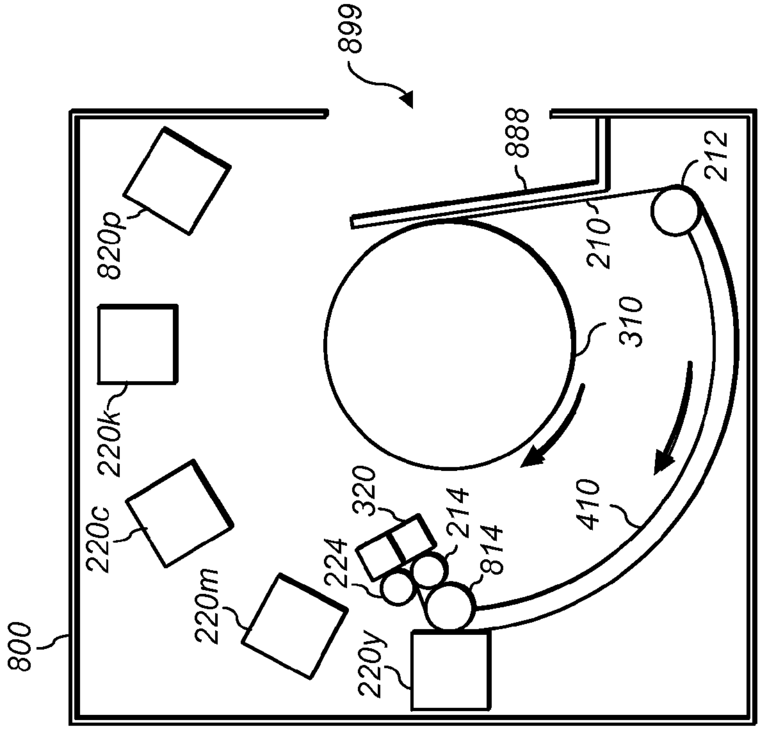
FIGS. 8A-8B show various embodiments using a curved platen 410 and an arcuate feed path.
Figure 8B:
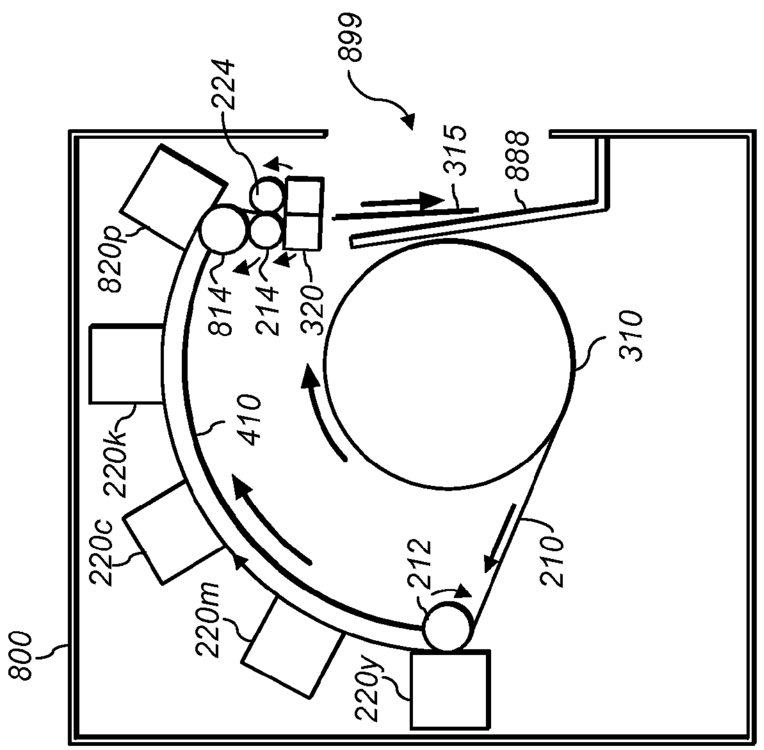

FIGS. 8A-8B show various embodiments using a curved platen 410 and an arcuate feed path. Printer 800 includes output tray 888 into which printed sheet 315 is deposited, and aperture 899 to permit an operator or user to access output tray 888 to retrieve printed sheet 315. Feed roll 310 and cutter

320 (represented graphically as opposed rectangles, each representing a cutting element) are as in FIG. 3. Receiver 210, supply roll 212, take-up roll 214, take-up tensioner 224, and printing modules 220*c*, 220*m*, 220*y*, and 220*k* are as in FIG. 2. Platen 410 is as shown in FIG. 4. Printer 800 also includes fifth printing module 820*p* for depositing a clear protectant separation image, and guide roller 814 for directing receiver 210 from platen 410 to take-up roll 214.

FIG. 8A shows operation in the first state. Platen 410 is traversing and receiver 210 is held in position with respect to platen 410 (i.e., pulled along with platen 410) by take-up roll 214 and take-up tensioner 224. Feed roll 310 is turning as it is pulled by receiver 210.

FIG. 8B shows operation in the second state. Platen 410 is stationary and receiver 210 is being drawn across platen 410 by take-up roll 214. Feed roll 310 is unwinding receiver 210. Cutter 320 has cut a printed sheet 315, which is falling into output tray 888. Cutter 320 can also cut leader 510 (FIG. 5) from web receiver 210. Leader 510 (FIG. 5) can fall into output tray 888 or can be deflected to a waste tray (not shown).

Figure 9:
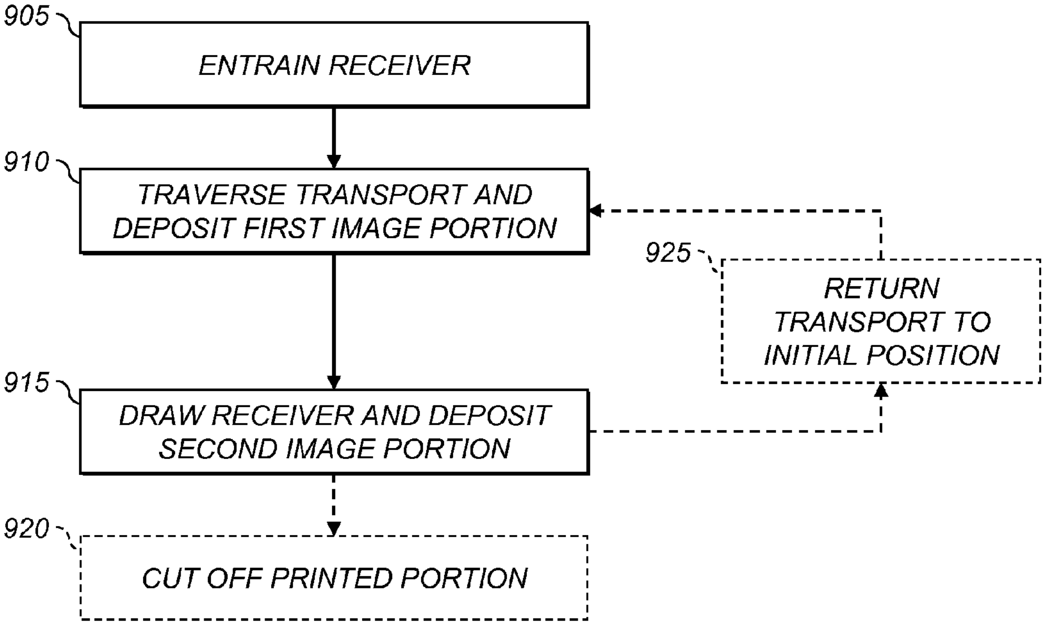
FIGS. 9-10 are flowcharts of methods of producing prints of a multi-channel image on a web receiver according to various embodiments.

FIG. 9 is a flowchart of methods of producing a print of a multi-channel image on a web receiver according to various embodiments. Processing begins with step 905.

In step 905, the web receiver is entrained around a take-up roll on a transport. Step 905 is followed by step 910.

In step 910, the transport is traversed past a plurality of non-contact printing modules. While the transport traverses, respective separation images are deposited on the receiver by activating the printing modules as they are brought into operative association with the receiver on the transport, so that a first portion of the image is printed. An example of this was shown in FIG. 5. By "traversed past" it is meant that the transport moves to successively bring the receiver into operative arrangement with more of the printing modules, until the receiver is in operative arrangement with the printing modules needed to produce the print image (and, optionally, other print modules not used for the particular image being printed). Once the receiver is in operative arrangement with the printing modules, the transport preferably does not move to remove the receiver from that arrangement until the print image is complete. Step 910 is followed by step 915.

In step 915, the receiver is drawn past the printing modules using the take-up roll and the printing modules are activated, so that a second portion of the image is printed. An example of this was shown in FIG. 6. Step 915 is optionally followed by step 920 or step 925.

In optional step 920, the printed portion is cut from the web receiver using a cutter downstream of the take-up roll in the feed path of the web receiver. An example of this was shown in FIG. 7.

In optional step 925, the transport is returned to its initial position after printing the second portion of the image. The web receiver remains entrained around the take-up roll, so after the transport traverses back over its path, it is in position to print the next image. Step 925 is followed by step 910. The transport can also return to its initial position so that additional ink can be deposited on the receiver. This permits depositing ink layers in an order different from the physical order of the printing modules along the receiver. This also provides drying time while the transport traverses back.

Figure 10:
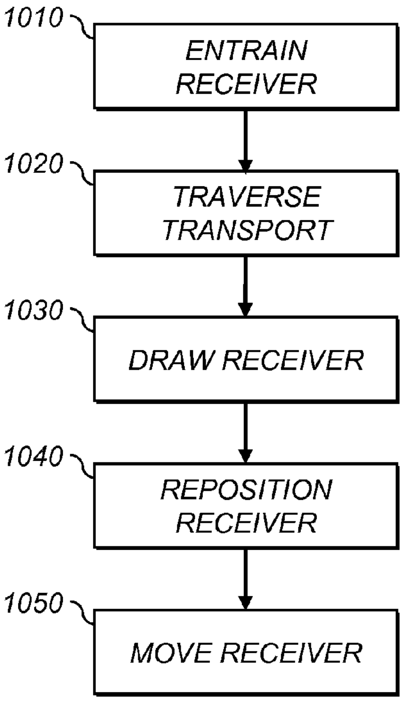

FIG. 10 shows a method of producing a print of a multi-channel image on a web receiver according to various embodiments. This method uses a single printing module to deposit more than one layer. For example, in microelectronics processing, one printing module can include a jettable etchant used to etch multiple layers of silicon. Processing begins with step 1010.

In step 1010, the web receiver is entrained around a take-up roll on a transport. Step 1010 is followed by step 1020.

In step 1020, the transport is traversed past a plurality of non-contact printing modules. Respective separation images are deposited on the receiver by activating the printing modules as they are brought into operative association with the receiver on the transport. In this way, a first portion of the image is printed. Step 1020 is followed by step 1030.

In step 1030, the receiver is drawn past the printing modules using the take-up roll. The printing modules are activated to deposit respective separation images on the receiver, so that a second portion of the image is printed.

During printing of the first or second portions, a selected one of the printing modules deposits a first-layer separation image on a selected area of the receiver in the first or second portion. The selected area can also be divided between the first and second portions. Step 1030 is followed by step 1040.

In step 1040, the receiver is repositioned by returning the transport or rewinding the receiver, or both. The receiver is repositioned so that the selected area of the receiver is brought back into operative association with the selected printing module. In various embodiments, the receiver is rewound until only the leader is entrained around the take-up roll, then the transport is traversed back. Step 1040 is followed by step 1050.

In step 1050, the receiver is moved by traversing the transport or drawing the receiver, or both, as appropriate for the amount of repositioning performed. The selected printing module is activated while the receiver moves, and deposits a second-layer separation image on the selected area of the receiver.

This method is particularly useful in microelectronics fabrication. Devices such as solar panels can use 50 materials or more. Moreover, substrates for microelectronic devices can be very expensive. Substrates can include patterned glass and mono-crystalline silicon. Reducing leader waste is particularly useful with expensive substrates.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. The word "or" is used in this disclosure in a non-exclusive sense, unless otherwise explicitly noted.

The invention has been described in detail with particular reference to certain preferred embodiments thereof, but it will be understood that variations, combinations, and modifications can be effected by a person of ordinary skill in the art within the spirit and scope of the invention.

PARTS LIST

10 Inkjet printer system
12 Image data source
14 Controller
15 Image processing unit
16 Electrical pulse source
18 First fluid source
19 Second fluid source

20 Recording medium
100 Inkjet printhead
110 Inkjet printhead die
111 Substrate
120 First nozzle array
121 Nozzle(s)
122 Ink delivery pathway (for first nozzle array)
130 Second nozzle array
131 Nozzle(s)
132 Ink delivery pathway (for second nozzle array)
181 Droplet(s) (ejected from first nozzle array)
182 Droplet(s) (ejected from second nozzle array)
210 receiver
212 supply roll
214 take-up roll
220*c*, 220*m*, 220*y*, 220*k* printing module
222 supply tensioner
224 take-up tensioner
225*c* droplet
240 feed path
305 transport
310 feed roll
315 printed sheet
320 cutter
405 transport
406 transport drive
410 platen
486 controller
510 leader
620*c*, 620*m* separation image
800 printer
814 guide roller
820*p* printing module
888 output tray
899 aperture
905 entrain receiver step
910 traverse transport and deposit first image portion step
915 draw receiver and deposit second image portion step
920 cut off printed portion step
925 return transport to initial position step
1010 entrain receiver step
1020 traverse transport step
1030 draw receiver step
1040 reposition receiver step
1050 move receiver step
d nozzle density

The invention claimed is:

1. Apparatus for printing a multi-channel image on a web receiver, comprising:

a) a plurality of printing modules arranged in sequence along a feed path of the receiver and spaced apart from the feed path, each adapted to produce on the receiver a separation image corresponding to one channel of the multi-channel image;

b) a movable transport for the web receiver, the transport including a take-up roll around which the receiver is entrained and a cutter arranged downstream of the take-up roll for selectively cutting the web receiver, wherein:

i) the transport is operative in a first state to traverse from the leading printing module to the trailing printing module;

ii) the take-up roll is operative in the first state to retain the receiver in position with respect to the transport; and iii) the take-up roll is operative in a second state to draw the receiver across the transport; and c) a controller adapted to perform the following steps in order:

operate the transport and take-up roll in the first state and activate one or more of the printing modules in sequence to print a first portion of the image;

once the transport traverses to bring the web receiver into operative arrangement with the plurality of printing modules, operate the take-up roll in the second state and activate one or more of the printing modules to print a second portion of the image; and cause the cutter to cut the web receiver to provide a cut sheet bearing the printed image.

2. The apparatus according to claim 1, wherein the transport further includes a supply roll upstream of the take-up roll, and the supply roll and take-up roll maintain a selected tension on the receiver while it is being printed.

3. The apparatus according to claim 1, wherein the transport further includes a platen upstream of the take-up roll across which draws the receiver across the platen in the second state.

4. The apparatus according to claim 1, wherein the controller is further adapted to operate the transport and the take-up roll so that the speed of a selected point on the receiver with respect to one or more of the printing modules is constant during a transition between the first state and the second state.

5. The apparatus according to claim 1, wherein the cutter is a perforator.

6. A method of producing a print of a multi-channel image on a web receiver, comprising:

entraining the web receiver around a take-up roll on a transport;

traversing the transport past a plurality of non-contact printing modules and depositing respective separation images on the receiver by activating the printing modules as they are brought into operative association with the receiver on the transport, so that a first portion of the image is printed; and drawing the receiver past the printing modules using the take-up roll and activating the printing modules to deposit respective separation images on the receiver, so that a second portion of the image is printed.

7. The method according to claim 6, further comprising cutting the printed portion from the web receiver using a cutter downstream of the take-up roll in the feed path of the web receiver.

8. The method according to claim 6, further comprising returning the transport to its initial position after printing the second portion of the image.

9. The method according to claim 6, further comprising decelerating the transport while accelerating the take-up roll so that the speed of a selected point on the receiver with respect to one or more of the printing modules is constant during a transition between the traversing step and the drawing step.

10. A method of producing a print of a multi-channel image on a web receiver, comprising:

entraining the web receiver around a take-up roll on a transport;

traversing the transport past a plurality of non-contact printing modules and depositing respective separation images on the receiver by activating the printing modules as they are brought into operative association with the receiver on the transport, so that a first portion of the image is printed;

drawing the receiver past the printing modules using the take-up roll and activating the printing modules to deposit respective separation images on the receiver, so that a second portion of the image is printed, wherein a selected one of the printing modules deposits a first-layer separation image on a selected area of the receiver in the first or second portion;

repositioning the receiver by returning the transport or rewinding the receiver, or both, so that the selected area of the receiver is brought into operative association with the selected printing module; and moving the receiver by traversing the transport or drawing the receiver, or both, while activating the selected printing module to deposit a second-layer separation image on the selected area of the receiver.

* * * * *